US011854316B2

(12) United States Patent
Matsumoto et al.

(10) Patent No.: US 11,854,316 B2
(45) Date of Patent: Dec. 26, 2023

(54) MANAGEMENT DEVICE, ENERGY STORAGE APPARATUS, AND FAILURE DIAGNOSIS METHOD

(71) Applicant: GS Yuasa International Ltd., Kyoto (JP)

(72) Inventors: Yu Matsumoto, Kyoto (JP); Kiyohiro Fujita, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 620 days.

(21) Appl. No.: 17/057,028

(22) PCT Filed: May 16, 2019

(86) PCT No.: PCT/JP2019/019421
§ 371 (c)(1),
(2) Date: Nov. 19, 2020

(87) PCT Pub. No.: WO2019/225452
PCT Pub. Date: Nov. 28, 2019

(65) Prior Publication Data
US 2021/0209872 A1 Jul. 8, 2021

(30) Foreign Application Priority Data
May 23, 2018 (JP) ................................ 2018-098515

(51) Int. Cl.
*G07C 5/08* (2006.01)
*H04W 4/40* (2018.01)
(Continued)

(52) U.S. Cl.
CPC ........... *G07C 5/0816* (2013.01); *G07C 5/008* (2013.01); *G07C 5/0808* (2013.01); *H01M 10/48* (2013.01); *H04W 4/40* (2018.02)

(58) Field of Classification Search
CPC ..... G07C 5/0816; G07C 5/008; G07C 5/0808; H01M 10/48; H01M 10/052;
(Continued)

(56) References Cited

U.S. PATENT DOCUMENTS

| 2006/0276947 A1 | 12/2006 | Kaita et al. |
| 2015/0008736 A1 | 1/2015 | Uchida et al. |
| 2018/0238968 A1 | 8/2018 | Wada et al. |

FOREIGN PATENT DOCUMENTS

| JP | 2006-335183 A | 12/2006 |
| JP | 2010057283 A * | 3/2010 |

(Continued)

OTHER PUBLICATIONS

International Search Report (ISR) (PCT Form PCT/ISA/210), in PCT/JP2019/019421, dated Aug. 20, 2019.

*Primary Examiner* — Michael J Zanelli
(74) *Attorney, Agent, or Firm* — MCGINN I.P. LAW GROUP, PLLC (57) ABSTRACT

A management device for an energy storage device mounted on a vehicle includes a management unit, a component that operates according to an instruction from the management unit and that generates an operation sound, and an acquisition unit that acquires information. The management unit operates the component and diagnoses a failure of the component when the information acquired by the acquisition unit satisfies a predetermined condition indicating a possibility that no person stays within the vehicle and within a certain distance from the vehicle.

15 Claims, 8 Drawing Sheets

(51) Int. Cl.
*G07C 5/00* (2006.01)
*H01M 10/48* (2006.01)

(58) Field of Classification Search
CPC ..... H01M 10/4257; H01M 2010/4271; H01M 50/209; H01M 50/249; H01M 50/284; H01M 2220/20; Y02E 60/10
See application file for complete search history.

(56) References Cited

FOREIGN PATENT DOCUMENTS

| | | | | |
|---|---|---|---|---|
| JP | 2015-133855 A | 7/2015 | | |
| JP | 2015-209126 A | 11/2015 | | |
| JP | 2016-010264 A | 1/2016 | | |
| JP | 2016-067149 A | 4/2016 | | |
| JP | 2016-208580 A | 12/2016 | | |
| JP | 2017-043274 A | 3/2017 | | |
| JP | 2017-216879 A | 12/2017 | | |
| JP | 2018-136314 A | 8/2018 | | |
| JP | 2018176924 A | * | 11/2018 | |
| KR | 1806721 B1 | * | 12/2017 | ............. E05B 81/13 |
| WO | WO 2013/146929 A1 | 10/2013 | | |

* cited by examiner

MANAGEMENT DEVICE, ENERGY STORAGE APPARATUS, AND FAILURE DIAGNOSIS METHOD

TECHNICAL FIELD

The present invention relates to a management device of an energy storage device mounted on a vehicle, an energy storage apparatus, and a failure diagnosis method for components included in the management device.

BACKGROUND ART

There is known a management device of an energy storage device mounted on a vehicle that includes a component generating an operation sound (see, for example, Patent Document 1). The energy storage device disclosed in Patent Document 1 is mounted on a vehicle, and the management device of the energy storage device includes a relay connected in series with the energy storage device. Since the relay is a component that opens and closes mechanically, an operation sound is usually generated when the relay is opened and closed.

PRIOR ART DOCUMENT

Patent Document

Patent Document 1: JP-A-2017-216879

SUMMARY OF THE INVENTION

Problems to be Solved by the Invention

If a component provided in the management device is out of order, the energy storage device cannot be managed properly. Therefore, it is desirable to operate the component and diagnose the failure of the component. However, conventionally, an operation sound of a component, such as a relay, when diagnosing a failure of a component generating an operation sound has not been sufficiently studied.

The present specification discloses a technique for diagnosing a failure of a component while suppressing the operation sound of the component from being heard by a person.

Means for Solving the Problems

A management device for an energy storage device mounted on a vehicle, the management device including: a management unit; a component that operates according to an instruction of the management unit and that generates an operation sound; and an acquisition unit that acquires information, in which the management unit operates the component and diagnoses a failure of the component when the information acquired by the acquisition unit satisfies a predetermined condition indicating a possibility that no person stays within the vehicle and within a certain distance from the vehicle.

Advantages of the Invention

It is possible to diagnose a failure of a component while suppressing the operation sound of the component from being heard by a person.

MODE FOR CARRYING OUT THE INVENTION

Overview of the Present Embodiment

A management device for an energy storage device mounted on a vehicle, the management device including: a management unit; a component that operates according to an instruction of the management unit and that generates an operation sound; and an acquisition unit that acquires information, in which the management unit operates the component and diagnoses a failure of the component when the information acquired by the acquisition unit satisfies a predetermined condition indicating a possibility that no person stays within the vehicle and within a certain distance from the vehicle.

The present inventor found the following technical problem in the process of examining a method for diagnosing a failure of a component.

When diagnosing a failure by operating a component that generates an operation sound, if the diagnosis is performed while a person stays within a certain distance from the vehicle an inside of the vehicle, the operation sound may be heard by a person. In recent years, the sound of vehicles has been reduced, and when a person hears the operation sound, it is suspected as abnormal sound from the vehicle, and unnecessary inspection and repair may be performed.

As a method of suppressing the operation sound from being heard by a person, it is conceivable to structurally insulate the management device. However, structural sound insulation increases costs, and complete sound insulation is difficult. It is possible to arrange the management device at a position where it is difficult for a person to hear the operation sound, but in that case, the degree of freedom in design is greatly limited.

According to the management device described above, since a failure of a component is diagnosed when there is a possibility that no person stays within the vehicle and within a certain distance from the vehicle, it is possible to diagnose a failure of the component while suppressing an operation sound of the component from being heard by a person. For this reason, it is not necessary to structurally insulate the management device, and there is no increase in cost due to it. Since there is no need to change the arrangement of the management device, the degree of freedom in design is not limited.

The component may include a relay connected in series with the energy storage device, and the management unit may open the relay to protect the energy storage device from an abnormality when an abnormality of the energy storage device is predicted.

The relay connected in series with the energy storage device is on the main circuit of the energy storage apparatus. The current is dispersed at the power supply destination to which electric power is supplied from the energy storage apparatus, but a large current flows because the current is not dispersed in the relay on the main circuit. Therefore, there is a concern that the relay on the main circuit may fail such as sticking.

When the relay is opened to protect the energy storage device from the abnormality when the abnormality of the energy storage device is predicted, the energy storage device cannot be protected from the abnormality if the relay is out of order. Therefore, it is desirable to open and close the relay to diagnose the failure of the relay. Since the relay is an important component related to not only the energy storage apparatus but also the electric system of the entire vehicle, it is desirable to diagnose the failure of the relay also in that sense.

However, since the relay is a component that opens and closes mechanically, an operation sound is generated when the relay is opened and closed. According to the management device described above, it is possible to diagnose a failure of the relay while suppressing an operation sound of opening and closing the relay from being heard by a person.

The acquisition unit may include a communication unit that communicates with the vehicle, and the management unit may determine whether or not the vehicle has been parked and whether or not a state in which a person stays in the vehicle has changed to a state in which no person stays in the vehicle, based on a signal received by the communication unit. The predetermined condition may be that after the vehicle is parked, a state in which a person stays in the vehicle has changed to a state in which no person stays in the vehicle, and a predetermined time has passed from when a state in which a person stays in the vehicle has changed to a state in which no person stays in the vehicle.

In this specification, a state when the ignition switch of the vehicle is in the off position is defined as a state in which the vehicle is parked, and a state when the ignition switch is in the on position is defined as a state in which the vehicle is not parked. Even if a state in which a person stays in the vehicle has changed to a state in which no person stays in the vehicle, there is a high possibility that a person stays near the vehicle when the vehicle is not parked (that is, when the ignition switch is in the on position). This is because, in general, a person rarely leaves the vehicle without parking the vehicle. On the other hand, after the vehicle is parked, when a state in which a person stays in the vehicle has changed to a state in which no person stays in the vehicle, there is a high possibility that no person stays within the vehicle and within a certain distance from the vehicle.

It takes a certain amount of time for a person to leave a certain distance from the vehicle. Therefore, even if a state in which a person stays in the vehicle changes to a state in which no person stays in the vehicle after the vehicle is parked, there is a high possibility that a person stays within a certain distance from the vehicle immediately after that. On the other hand, there is a high possibility that no person stays within a certain distance from the vehicle after a lapse of a predetermined time from the time when a state in which a person stays in the vehicle has changed to a state in which no person stays in the vehicle.

Therefore, according to the management device described above, when there is a possibility that no person stays within the vehicle and within a certain distance from the vehicle, the failure of the component can be diagnosed.

The acquisition unit may include a communication unit that communicates with the vehicle, and a current sensor that measures a current value of a current flowing through the energy storage device, and the management unit may determine whether or not the vehicle is parked, based on a signal received by the communication unit. The predetermined condition may be that a current value of the current flowing through the energy storage device temporarily increases in a process in which after the vehicle is parked, the current value gradually decreases.

In recent years, installation of a smart entry system including a communication function in a vehicle key has become common. In the smart entry system, when a person leaves the vehicle for a certain distance after the vehicle is parked, the vehicle door is automatically locked (hereinafter, simply referred to as a door lock). For this reason, there is a possibility that no person stays within the vehicle and within a certain distance from the vehicle at the timing when the door is locked.

When the vehicle is parked, the current flowing through the energy storage device gradually decreases. Therefore, in the smart entry system, a characteristic current waveform appears in which a current value of the current flowing through the energy storage device temporarily increases to supply the current for the door lock in the process in which the vehicle is parked and the current value gradually decreases.

According to the above management device, since a failure of a component is diagnosed when a current value of the current flowing through the energy storage device temporarily increases in the process in which after the vehicle is parked, the current value gradually decreases, when an energy storage apparatus is mounted on a vehicle on which the smart entry system is mounted, a failure of a component is diagnosed when there is a possibility that no person stays within the vehicle and within a certain distance from the vehicle.

The acquisition unit may include a communication unit that communicates with the outside of the vehicle.

Whether or not the predetermined condition is satisfied can also be determined from the information acquired from outside the vehicle. According to the above management device, it is possible to determine whether or not the predetermined condition is satisfied from the information acquired from outside the vehicle.

The vehicle may be a four-wheel vehicle.

Generally, an energy storage device mounted on a four-wheel vehicle has a larger maximum current than an energy storage device mounted on a motorcycle. If the maximum current is large, the failure rate of components may increase. Therefore, it is desired that a management device of the energy storage device mounted on a four-wheel vehicle diagnoses a component failure more frequently than a management device of the energy storage device mounted on a motorcycle.

According to the above management device, since it is mounted on a four-wheel vehicle, compared with the case where it is mounted on a motorcycle, the effect of diagnosing a component failure while suppressing the operation sound of the component from being heard by a person is more effective.

The vehicle may be an electric vehicle.

Generally, an energy storage device mounted on an electric vehicle has a larger maximum current than an energy storage device mounted on an engine vehicle equipped with a gasoline engine or a diesel engine. If the maximum current is large, the failure rate of components may increase. For this reason, it is desired that the management device of the energy storage device mounted on the electric vehicle diagnose the failure of the component more frequently than the management device of the energy storage device mounted on the engine vehicle.

According to the above management device, since it is mounted on an electric vehicle that is quieter, compared to a case where it is installed in an engine vehicle, it is more effective to diagnose a component failure while suppressing an operation sound of the component from being heard by a person.

The invention disclosed in this specification can be realized in various modes such as an apparatus, a method, a computer program for realizing the functions of the apparatus or method, and a recording medium recording the computer program.

First Embodiment (1) Configuration of Energy Storage Apparatus

Figure 1:
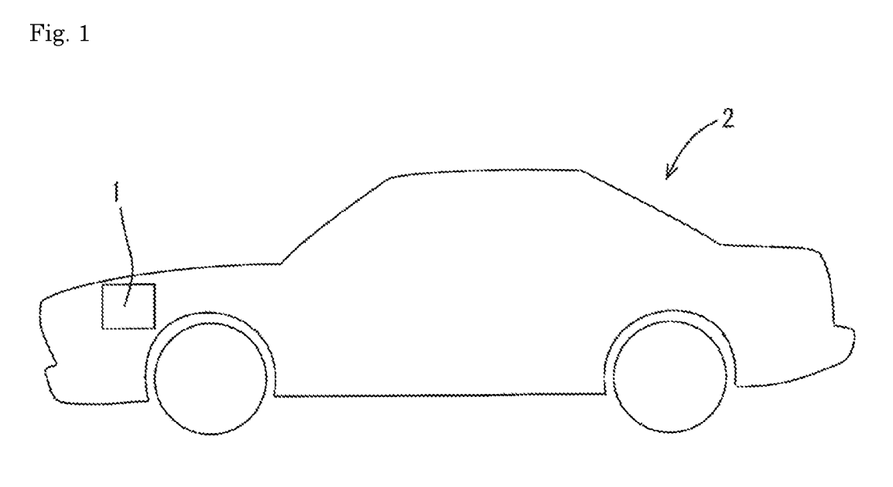
FIG. 1 is a schematic diagram of an energy storage apparatus according to a first embodiment and a vehicle equipped with the energy storage apparatus.

An energy storage apparatus 1 according to the first embodiment will be described with reference to FIG. 1. In FIG. 1, a vehicle 2 is an engine vehicle (an example of a four-wheel vehicle) equipped with a gasoline engine, a diesel engine, or the like. The energy storage apparatus 1 is mounted on the vehicle 2, and supplies electric power to a starter for starting an engine of the vehicle 2 and auxiliary machineries (light, air conditioner, audio, etc.) mounted on the vehicle 2. The energy storage apparatus 1 may be installed in an electric vehicle, a hybrid vehicle, a plug-in hybrid vehicle, or the like to supply electric power to auxiliary machineries.

Figure 2:
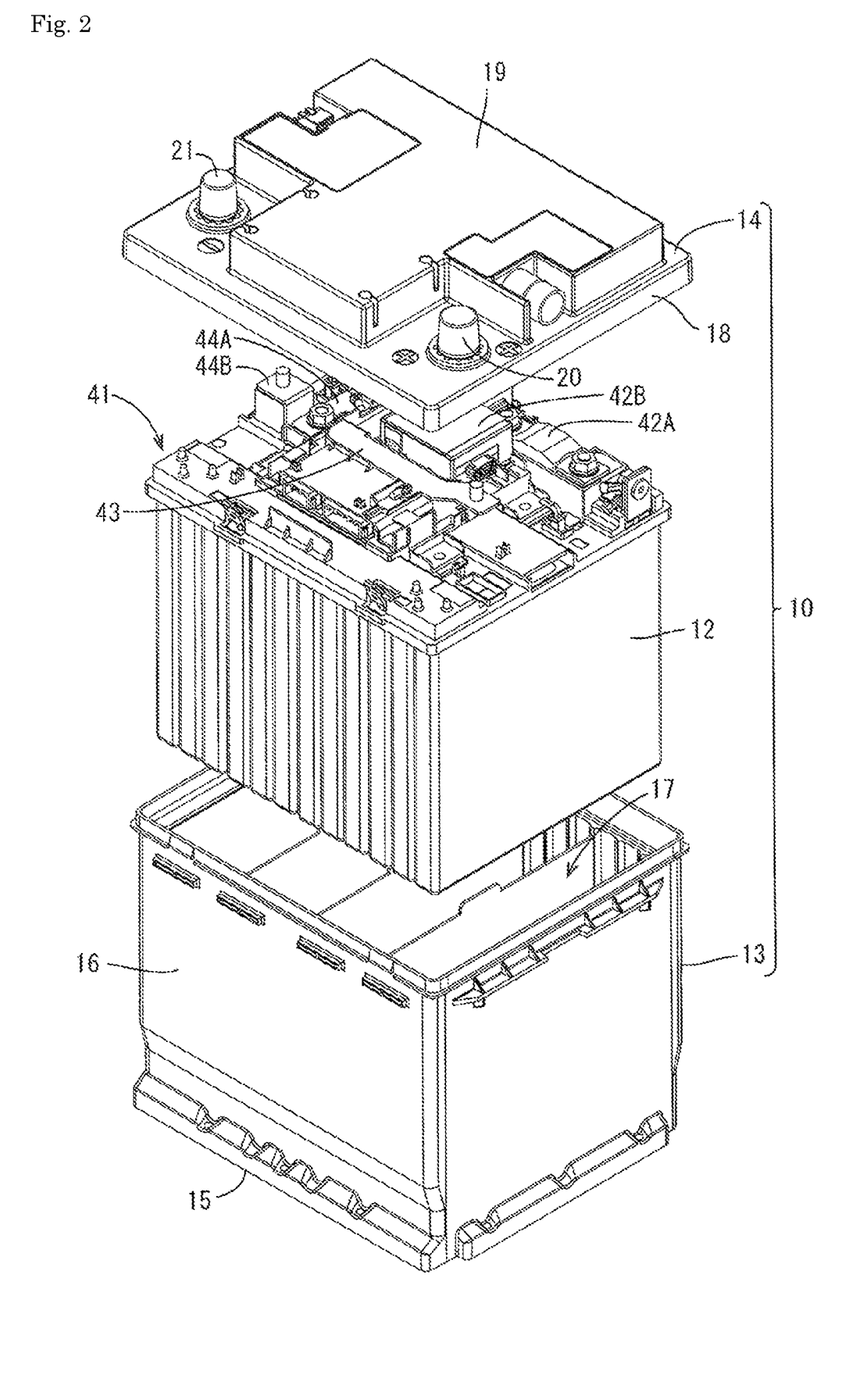
FIG. 2 is an exploded perspective view of the energy storage apparatus.

As shown in FIG. 2, the energy storage apparatus 1 includes an outer case 10, and a plurality of energy storage devices 12 housed inside the outer case 10. The outer case 10 is composed of a main body 13 and a lid body 14 made of a synthetic resin material. The main body 13 has a bottomed tubular shape, and is composed of a bottom surface portion 15 having a rectangular shape in plan view and four side surface portions 16 rising from four sides thereof to form a tubular shape. An upper opening 17 is formed in an upper end portion by the four side surface portions 16.

The lid body 14 has a rectangular shape in plan view, and a frame body 18 extends downward from four sides thereof. The lid body 14 closes the upper opening 17 of the main body 13. On the upper surface of the lid body 14, a protruding portion 19 having a substantially T-shape in plan view is formed. A positive electrode external terminal 20 is fixed to one corner portion of the two locations where the protruding portion 19 is not formed on the upper surface of the lid body 14, and a negative electrode external terminal 21 is fixed to the other corner portion.

Figure 3A:
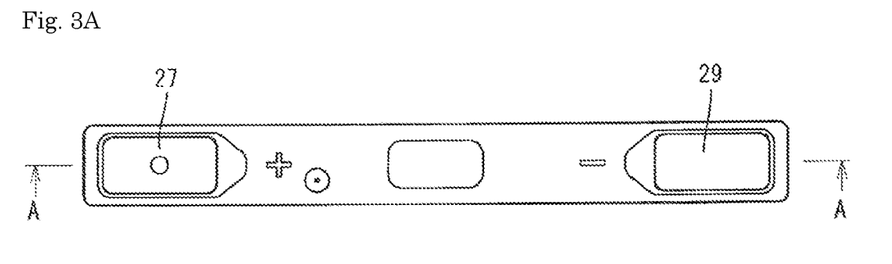
FIG. 3A is a plan view of an energy storage device shown in FIG. 2.
Figure 3B:
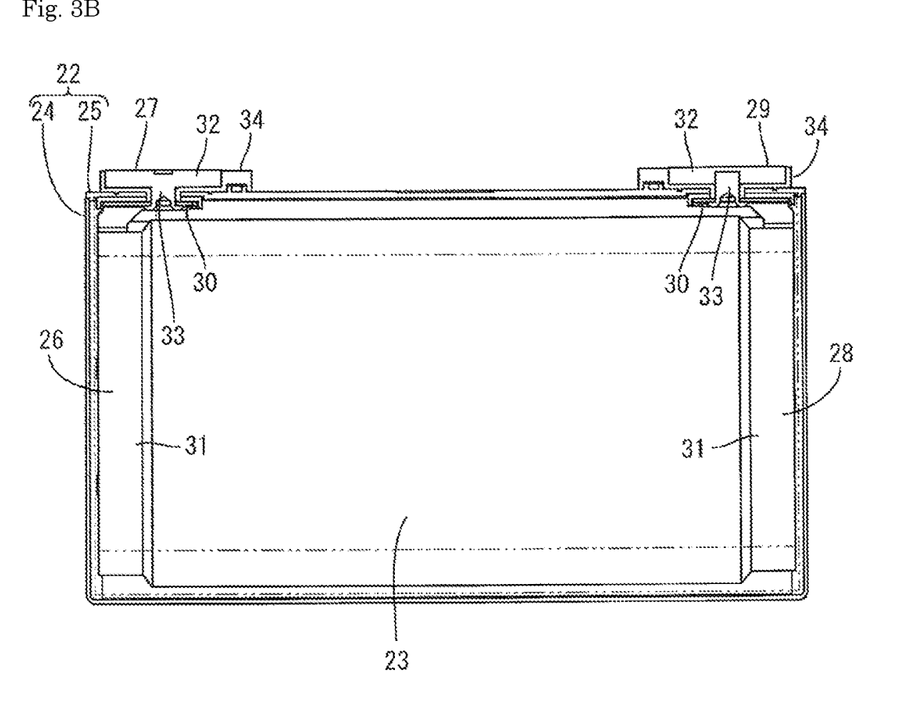
FIG. 3B is a sectional view taken along a line A-A shown in FIG. 3A.

The energy storage device 12 is a repeatedly chargeable secondary battery, and is specifically, for example, a lithium-ion battery. As shown in FIGS. 3A and 3B, the energy storage device 12 is one in which an electrode assembly 23 is housed in a rectangular parallelepiped case 22 together with a non-aqueous electrolyte. The case 22 is composed of a case body 24 and a cover 25 that closes an opening above the case body 24.

The electrode assembly 23, although not shown in detail, has a separator made of a porous resin film arranged between a negative electrode element formed by applying an active material to a substrate made of copper foil and a positive electrode element formed by applying an active material to a substrate made of aluminum foil. These are all belt-shaped, and are wound in a flat shape so that they can be housed in the case body 24 in a state where the negative electrode element and the positive electrode element are displaced from each other on the opposite sides in the width direction with respect to the separator.

A positive electrode terminal 27 is connected to the positive electrode element via a positive electrode current collector 26. A negative electrode terminal 29 is connected to the negative electrode element via a negative electrode current collector 28. Each of the positive electrode current collector 26 and the negative electrode current collector 28 has a plate-shaped pedestal portion 30 and a leg portion 31 extending from the pedestal portion 30. Through holes are formed in the pedestal portion 30. The leg portion 31 is connected to the positive electrode element or the negative electrode element. Each of the positive electrode terminal 27 and the negative electrode terminal 29 has a terminal main body portion 32 and a shaft portion 33 protruding downward from the center portion of the lower surface thereof. The terminal main body portion 32 and the shaft portion 33 of the positive electrode terminal 27 are integrally formed of aluminum (single material). In the negative electrode terminal 29, the terminal main body portion 32 is made of aluminum, the shaft portion 33 is made of copper, and these are assembled. The terminal main body portions 32 of the positive electrode terminal 27 and the negative electrode terminal 29 are arranged at both ends of the cover 25 via gaskets 34 made of an insulating material, and are exposed to the outside from the gaskets 34.

Figure 4:
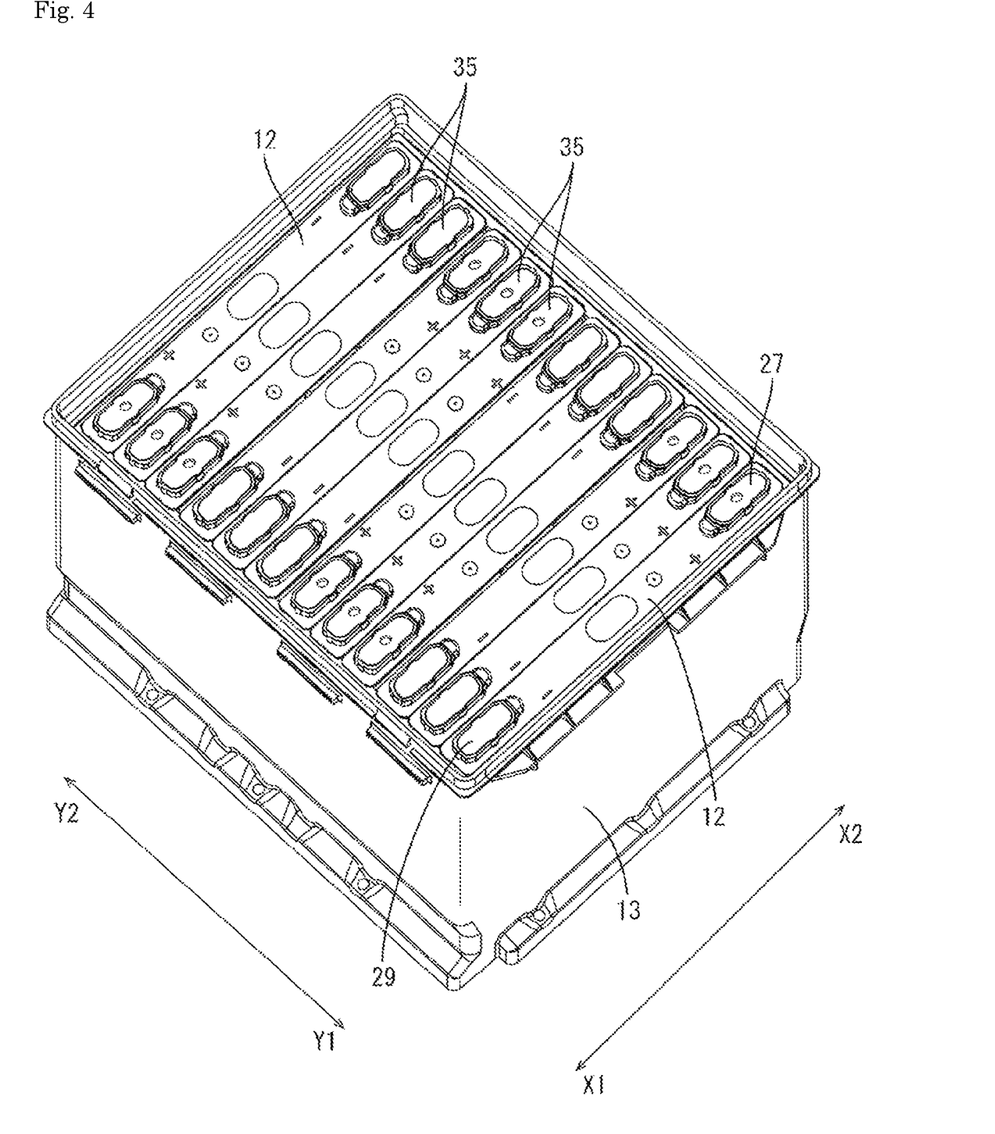
FIG. 4 is a perspective view showing a state in which the energy storage device is housed in a main body of FIG. 1.

As shown in FIG. 4, a plurality of (for example, twelve) energy storage devices 12 are housed in the main body 13 in a state of being arranged in the width direction. Here, the plurality of energy storage devices 12 are arranged from one end side to the other end side of the main body 13 (direction of arrow Y1 to Y2) with three energy storage devices 12 as one set so that in the same set, the terminal polarities of adjacent energy storage devices 12 are the same, and between adjacent sets, the terminal polarities of adjacent energy storage devices 12 are opposite to each other. In the three energy storage devices 12 (first set) located closest to the arrow Y1 side, the arrow X1 side is the negative electrode and the arrow X2 side is the positive electrode. In the three energy storage devices 12 (second set) adjacent to the first set, the arrow X1 side is the positive electrode and the arrow X2 side is the negative electrode. Furthermore, the third set adjacent to the second set has the same arrangement as the first set, and the fourth set adjacent to the third set has the same arrangement as the second set.

Figure 5:
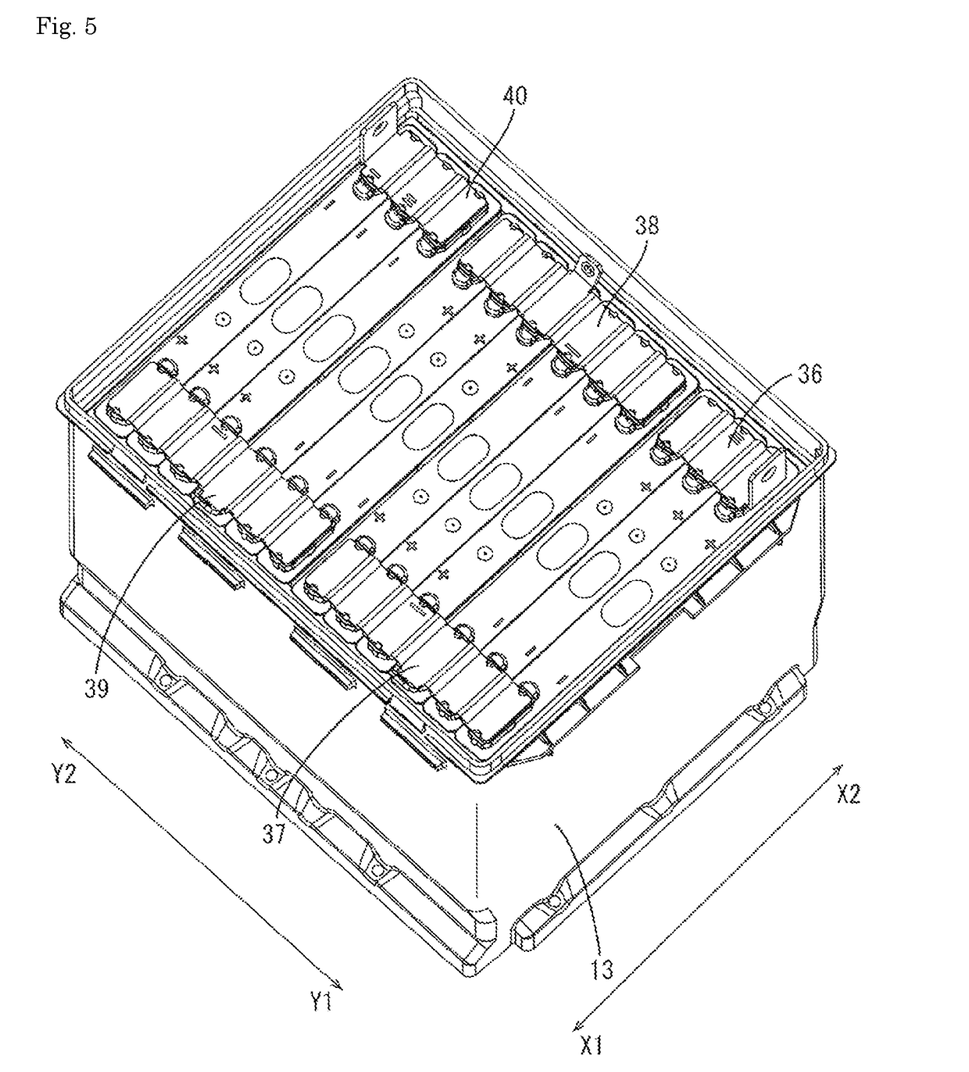
FIG. 5 is a perspective view showing a state in which a bus bar is attached to the energy storage device of FIG. 4.

As shown in FIG. 5, terminal bus bars (connecting members) 36 to 40 as conductive members are connected to the positive electrode terminal 27 and the negative electrode terminal 29 by welding. On the arrow X2 side of the first set, the positive electrode terminals 27 are connected by the first bus bar 36. Between the first set and the second set, the negative electrode terminals 29 of the first set and the positive electrode terminals 27 of the second set are connected by the second bus bar 37 on the arrow X1 side.

Between the second set and the third set, the negative electrode terminals 29 of the second set and the positive electrode terminals 27 of the third set are connected by the third bus bar 38 on the arrow X2 side. Between the third set and the fourth set, the negative electrode terminals 29 of the third set and the positive electrode terminals 27 of the fourth set are connected by the fourth bus bar 39 on the arrow X1 side. On the arrow X2 side of the fourth set, the negative electrode terminals 29 are connected by the fifth bus bar 40.

Referring also to FIG. 2, the first bus bar 36 located at one end of the flow of electricity is connected to the positive electrode external terminal 20 via a first electronic device 42A (for example, fuse), a second electronic device 42B (for example, relay), a bus bar 43 and a bus bar terminal (not shown). The fifth bus bar 40 located at the other end of the flow of electricity is connected to the negative electrode external terminal 21 via bus bars 44A and 44B and a negative electrode bus bar terminal (not shown). As a result, each energy storage device 12 can be charged and discharged via the positive electrode external terminal 20 and the negative electrode external terminal 21. The electronic devices 42A and 42B and the electric component connecting bus bars 43, 44A, and 44B are attached to a circuit board unit 41 arranged above the plurality of energy storage devices 12 that are stacked. The bus bar terminal is arranged on the lid body 14.

(2) Electrical Configuration of Energy Storage Apparatus

Figure 6:
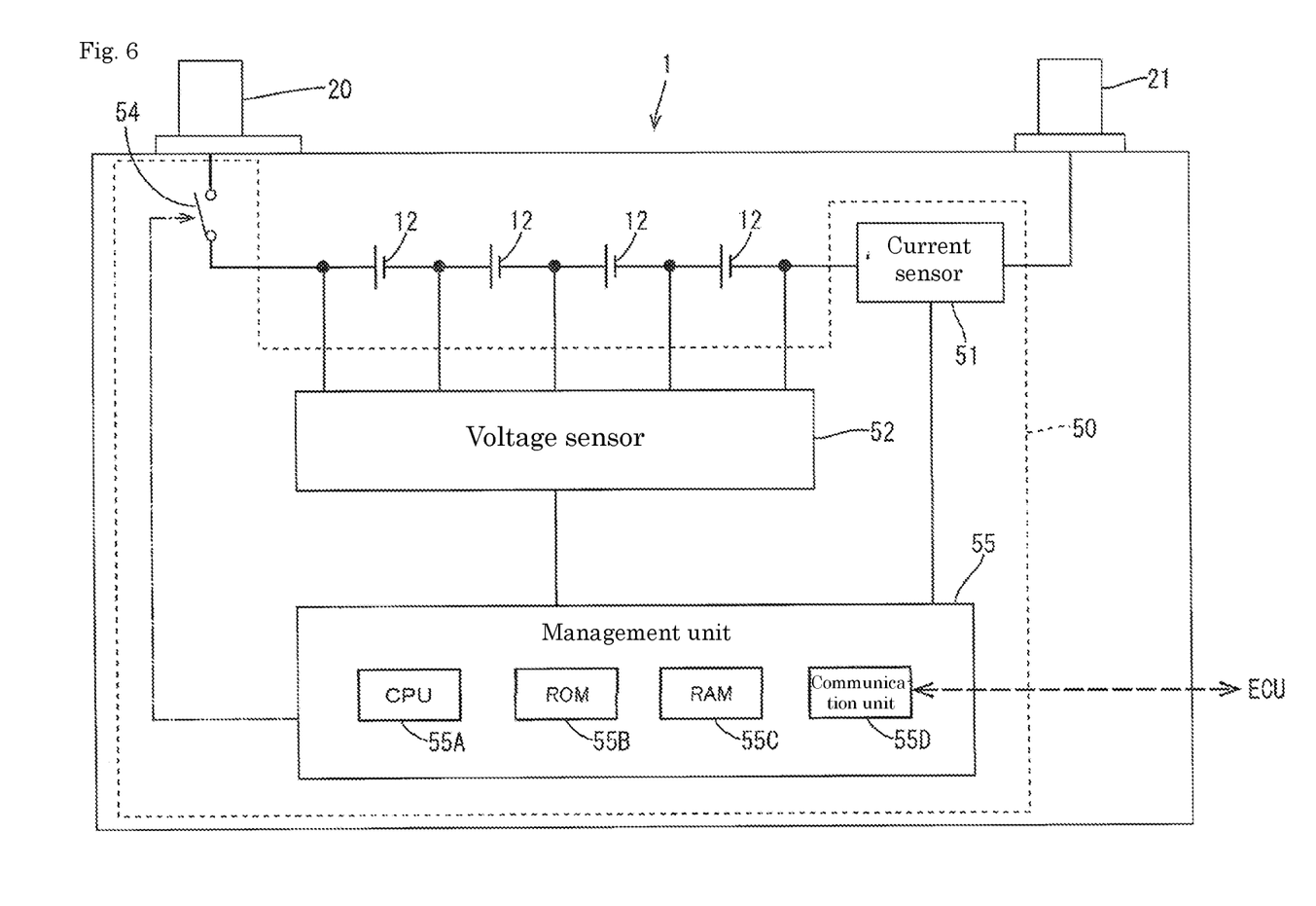
FIG. 6 is a block diagram showing an electrical configuration of the energy storage apparatus.

As shown in FIG. 6, the energy storage apparatus 1 includes a plurality of energy storage devices 12 described above and a battery management system 50 (BMS) that manages these energy storage devices 12. The BMS 50 is an example of a management device.

The BMS 50 is mounted on the circuit board unit 41 shown in FIG. 2. The BMS 50 includes a current sensor 51 (an example of an acquisition unit), a voltage sensor 52, a relay 54 (an example of a component that generates an operation sound), and a management unit 55.

The current sensor 51 is connected in series with the energy storage device 12. The current sensor 51 measures the current value I [A] of the current flowing through the energy storage device 12 and outputs it to the management unit 55.

The voltage sensor 52 is connected in parallel with each energy storage device 12. The voltage sensor 52 measures the voltage value V [V], which is the terminal voltage of each energy storage device 12, and outputs it to the management unit 55.

The relay 54 is connected in series with the energy storage device 12. The relay 54 is for protecting the energy storage device 12 from overcharging and overdischarging, and is opened and closed by the management unit 55.

The management unit 55 operates by the electric power supplied from the energy storage device 12, and includes a CPU 55A, a ROM 55B, a RAM 55C, a communication unit 55D (an example of an acquisition unit), and the like. The communication unit 55D is for communicating with an ECU (Engine Control Unit) of the vehicle 2. The CPU 55A manages each unit of the energy storage apparatus 1 by executing various management programs stored in the ROM 55B.

The management unit 55 may include an ASIC (Application Specific Integrated Circuit), an FPGA (Field Programmable Gate Array), or the like instead of the CPU 55A or in addition to the CPU 55A.

(3) Ignition Signal and Getting-Off Signal

The energy storage apparatus 1 receives various signals from an ECU (Engine Control Unit) of the vehicle 2. Here, an ignition signal (an example of information) and a getting-off signal (an example of information) of signals received by the energy storage apparatus 1 from the ECU of the vehicle 2 will be described.

When parking the vehicle 2, the driver of the vehicle 2 turns the ignition switch of the vehicle 2 from the on position to the off position. The ignition signal is a signal indicating whether the ignition switch is in the on position or the off position. When the ignition switch is in the on position, ON (IG_ON) is transmitted, and when it is in the off position, OFF (IG_OFF) is transmitted. The ignition signal is transmitted from the ECU of the vehicle 2 at regular time intervals. Therefore, the management unit 55 can know that the vehicle 2 is parked by the ignition signal changing from ON to OFF.

The getting-off signal is a signal indicating that a state in which a person stays in the vehicle 2 has changed to a state in which no person stays in the vehicle 2. The vehicle 2 has a sensor (an infrared sensor, a pressure sensor installed in a seat, a temperature sensor, etc.) that detects a person in the vehicle 2. The ECU of the vehicle 2 transmits a getting-off signal to the energy storage apparatus 1 when a state in which a person is detected by the sensor changes to a state in which no person is detected.

(4) Protection of Energy Storage Device

The management unit 55 estimates the state of charge (SOC) of the energy storage device 12 at predetermined time intervals, and when the SOC increases to a predetermined upper limit or more or decreases to a predetermined lower limit or less, opens the relay 54 assuming that an abnormality (overcharge or overdischarge) of the energy storage device 12 is predicted. This protects the energy storage device 12 from abnormality.

A current integration method, for example, is known as a method for estimating SOC. The current integration method is a method in which the charge/discharge current of the energy storage device 12 is constantly measured by the current sensor 51 to measure the amount of electric power flowing in and out of the energy storage device 12, and this is adjusted from the initial capacity to estimate the SOC.

The SOC and the open circuit voltage (OCV) of the energy storage device 12 have a relatively accurate correlation. Therefore, the relay 54 may be opened assuming that abnormality of the energy storage device 12 is predicted when the OCV increases above a predetermined upper limit or decreases below a predetermined lower limit. The OCV is not necessarily a voltage when the circuit is open, but may be a voltage when the current flowing through the energy storage device 12 is below a predetermined reference value.

(5) Failure Diagnosis of Relay

If the relay 54 fails and does not open, the energy storage device 12 cannot be protected from abnormality. Therefore, the management unit 55 opens and closes the relay 54 to diagnose the failure of the relay 54. For example, the management unit 55 opens the relay 54 and measures the current value with the current sensor 51. If the relay 54 has not failed, the relay 54 opens and the current value measured with the current sensor 51 becomes 0 A (ampere). On the other hand, when the relay 54 is out of order, the relay 54 does not open, so the current value measured with the current sensor 51 becomes larger than 0 A. The management unit 55 determines that the relay 54 has not failed when the measured current value is 0 A, and determines that the relay 54 has failed when the measured current value is greater than 0 A.

The method of diagnosing the failure of the relay 54 described above is an example. The method of diagnosing the failure of the relay 54 may be any method as long as it involves opening and closing the relay 54.

(6) Timing to Perform Failure Diagnosis of Relay

The management unit 55 performs failure diagnosis of the relay 54 when the signal received by the communication unit 55D satisfies a predetermined condition indicating a possibility that no person stays within a certain distance from the vehicle 2 including the inside of the vehicle 2. The certain distance is a distance at which the operation sound of the relay 54 cannot be heard by a person, and is a distance determined by the loudness of the operation sound of the relay 54.

The predetermined condition of the first embodiment is that after the vehicle 2 is parked, a getting-off signal is received from the vehicle 2 and a predetermined time has elapsed since the getting-off signal was received.

Figure 7:
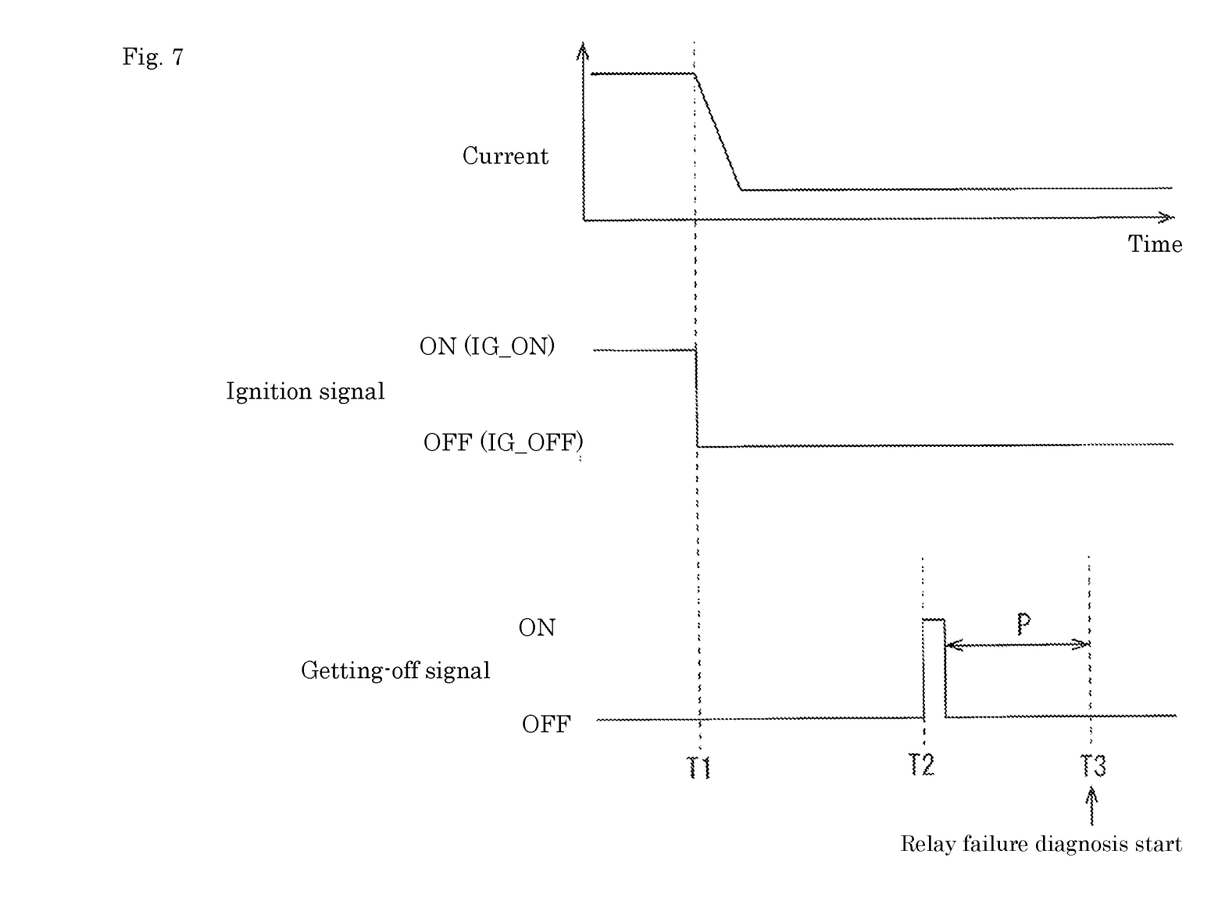
FIG. 7 is a timing chart of a current flowing through the energy storage device, an ignition signal, and a getting-off signal.

The above-mentioned predetermined condition will be described more specifically with reference to FIG. 7. In FIG. 7, a time point T1 is a time point when the ignition signal of the vehicle 2 has changed from ON to OFF. That is, the time point T1 is a time point when the vehicle 2 is parked. Normally, an occupant gets off the vehicle 2 after parking the vehicle 2, but even if the vehicle 2 is parked, the occupant may not immediately get off the vehicle 2. Therefore, simply parking the vehicle 2 does not necessarily mean that there is a high possibility that no person stays within a certain distance from the vehicle 2 including the inside of the vehicle 2.

A time point T2 is a time point when the getting-off signal is received. The occupant may get off the vehicle 2 with the ignition switch kept in the on position. However, normally, a person rarely leaves the vehicle 2 for a certain distance or more with the ignition switch kept in the on position. For this reason, it cannot be said that there is a high possibility that no person stays within a certain distance from the vehicle 2 including the inside of the vehicle 2 simply by receiving the getting-off signal. On the other hand, if the getting-off signal is received after the ignition switch is set to the off position (after the vehicle 2 is parked), there is a high possibility that no person stays within a certain distance from the vehicle 2 including the inside of the vehicle 2.

However, since it takes some time for a person to leave the vehicle 2 for a certain distance or more, there is a high possibility that a person still stays within a certain distance immediately after receiving the getting-off signal after the vehicle 2 is parked. On the other hand, after a predetermined time P has elapsed from the time of receiving the getting-off signal (a time point T3 shown in FIG. 7), there is a high possibility that no person stays within a certain distance from the vehicle 2 including the inside of the vehicle 2. The predetermined time P is a time required for a person to walk the certain distance, and is a time determined by an assumed walking speed and the certain distance.

For the above reason, when the above-mentioned predetermined condition is satisfied, there is a possibility that no person stays within a certain distance from the vehicle 2 including the inside of the vehicle 2. Therefore, the management unit 55 diagnoses the failure of the relay 54 when the above-mentioned predetermined condition is satisfied.

The failure diagnosis of the relay 54 may be performed every time when the predetermined condition described above is satisfied, or may not be performed every time, such as once every two times, once every three times, or the like.

(7) Effect of Embodiment

According to the BMS 50, since a failure of the relay 54 is diagnosed when there is a possibility that no person stays within a certain distance from the vehicle 2 including the inside of the vehicle 2, it is possible to diagnose the failure of the relay 54 while suppressing the operation sound of the relay 54 from being heard by a person. For this reason, it is not necessary to structurally insulate the BMS 50, and there is no increase in cost due to it. Since there is no need to change the arrangement of the BMS 50, the freedom of design is not limited.

According to the BMS 50, the component that generates the operation sound is the relay 54 that is connected in series with the energy storage device 12. Since the relay 54 is a component that opens and closes mechanically, an operation sound is generated when the relay 54 is opened and closed. According to the BMS 50, it is possible to diagnose a failure of the relay 54 while suppressing the operation sound of opening and closing the relay 54 from being heard by a person.

According to the BMS 50, the predetermined condition is that after the vehicle 2 is parked, a getting-off signal is received from the vehicle 2 and a predetermined time has elapsed from the time when the getting-off signal was received. Therefore, when there is a possibility that no person stays within a certain distance from the vehicle 2 including the inside of the vehicle 2, the failure of the relay 54 can be diagnosed.

According to the BMS 50, since it is mounted on a four-wheel vehicle, compared to the case where it is mounted on a motorcycle, the effect of diagnosing a failure of the relay 54 while suppressing the operation sound of the relay 54 from being heard by a person is more effective.

Second Embodiment

The second embodiment will be described with reference to FIG. 8.

(1) Smart Entry System

The vehicle 2 of the second embodiment is equipped with the smart entry system. In the smart entry system, a key has a communication function, and a door is automatically locked when a person leaves the vehicle 2 for a certain distance after the vehicle 2 is parked. For this reason, there is a possibility that no person stays within a certain distance from the vehicle 2 including the inside of the vehicle 2 at a timing when the door is locked.

Figure 8:
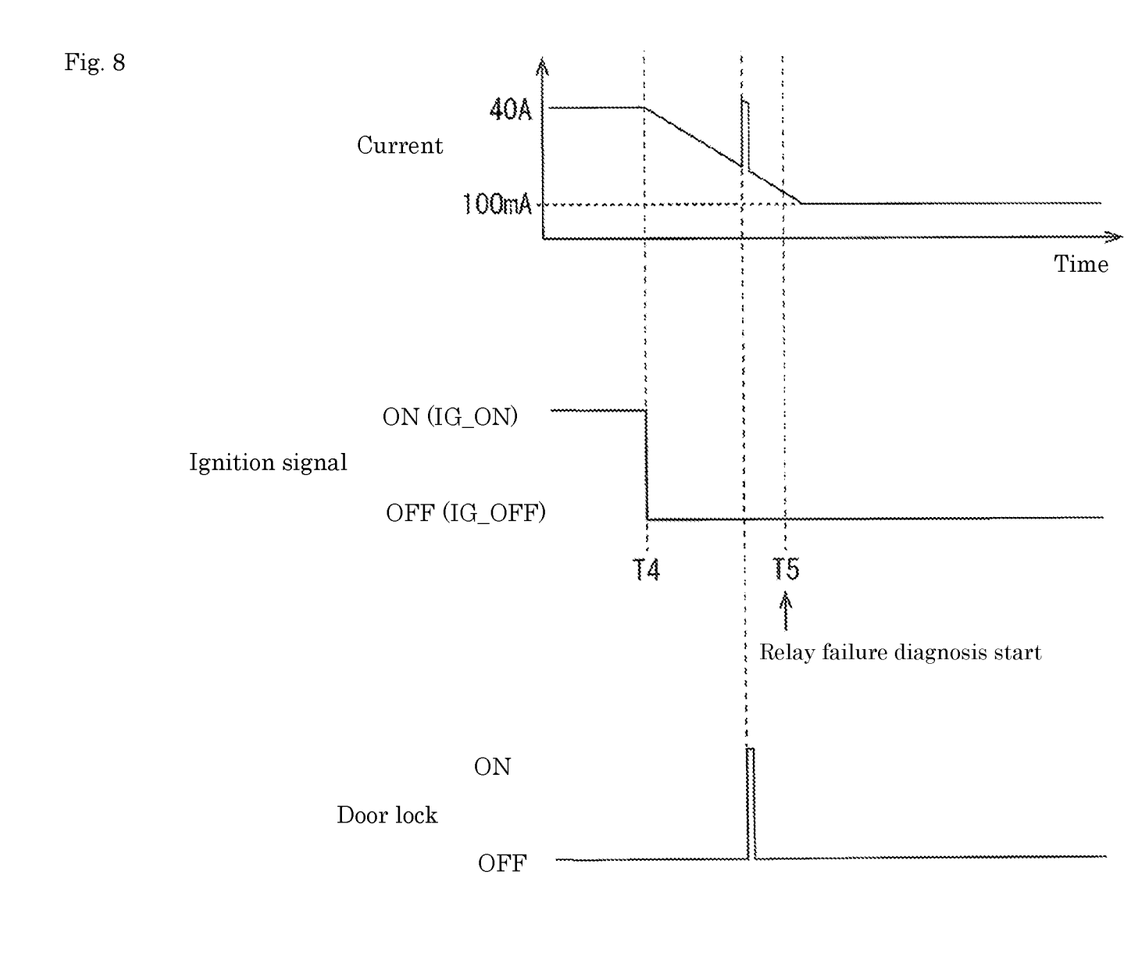
FIG. 8 is a timing chart of a current flowing through an energy storage device according to a second embodiment, an ignition signal, and a getting-off signal.

With reference to FIG. 8, a change in current flowing through the energy storage device 12 when the energy storage apparatus 1 is mounted on the vehicle 2 on which the smart entry system is mounted will be described. In FIG. 8, a time point T4 is a time point when the ignition signal (an example of information) of the vehicle 2 changes from ON to OFF. That is, the time point T4 is a time point when the vehicle 2 is parked.

When the vehicle 2 is parked, the current flowing through the energy storage device 12 gradually decreases. In the smart entry system, when a person leaves the vehicle 2 for a certain distance, a current for door lock (for example, 30 A [ampere], pulse width 50 ms to 100 ms [millisecond]) temporarily flows. Therefore, in the smart entry system, a characteristic current waveform appears in which a current value (an example of information) of the current flowing through the energy storage device 12 temporarily increases in the process in which the vehicle 2 is parked and the current value gradually decreases.

(2) Timing to Perform Failure Diagnosis of Relay

The predetermined condition of the second embodiment is that the aforementioned characteristic current waveform of the smart entry system is detected after the vehicle 2 is parked. Specifically, after the vehicle 2 is parked, a current value of the current flowing through the energy storage device 12 gradually increases in the process in which the current value gradually decreases.

When the vehicle 2 is parked, the management unit 55 measures the current value with the current sensor 51 (an example of an acquisition unit) and determines whether or not the current value has increased after the current value gradually decreased. When the current value has increased, the management unit 55 determines whether or not the current value has decreased to a current value smaller than the current value measured immediately before the current value increases, within a certain time after the current value has increased. The certain time is, for example, 50 ms to 100 ms [millisecond]. The management unit 55 determines that the current value has temporarily increased when the current value has decreased within a certain time, and determines whether the current value has gradually decreased thereafter. If the current value has gradually decreased thereafter, the management unit 55 determines that the above-described predetermined condition is satisfied.

When time passes after the above-described predetermined condition is satisfied, there is a possibility that a person has returned to the vicinity of the vehicle 2 during that time. On the other hand, immediately after the above-described predetermined condition is satisfied, there is a high possibility that no person stays within a certain distance from the vehicle 2 including the inside of the vehicle 2. Therefore, when the management unit 55 determines that the above-described predetermined condition is satisfied, it immediately diagnoses the failure of the relay 54.

(3) Effect of Embodiment

According to the BMS 50, when the energy storage apparatus 1 is mounted on the vehicle 2 on which the smart entry system is mounted, the failure of the relay 54 can be diagnosed when there is a possibility that no person stays within a certain distance from the vehicle 2 including the inside of the vehicle 2.

Other Embodiments

The technology disclosed in the present specification is not limited to the embodiments described by the above description and the drawings, and, for example, the following embodiments are also included in the technical scope disclosed in the present specification.

(1) In the above embodiment, the relay 54 is described as an example of the component that generates the operation sound, but the component that generates the operation sound is not limited to the relay 54. For example, the component that generates the operation sound may be a magnet switch.

(2) In the above embodiment, the case of diagnosing the failure of the relay 54 connected in series with the energy storage device 12 has been described as an example, but the relay 54 to be a target of failure diagnosis is not limited to the one connected in series with the energy storage device 12. For example, when the energy storage apparatus 1 includes a relay other than the relay 54 that is connected in series with the energy storage device 12, a failure of the relay may be diagnosed.

(3) In the above embodiment, the ignition signal is described as an example of the signal for determining whether or not the vehicle 2 is parked. On the other hand, the vehicle 2 may transmit a parking signal at a timing when parked, and the management unit 55 may determine that the vehicle 2 is parked when receiving the parking signal.

(4) In the above embodiment, the case has been described as an example in which the vehicle 2 transmits a getting-off signal to the energy storage apparatus 1 when a state in which a person stays in the vehicle 2 changes to a state in which no person stays in the vehicle 2. On the other hand, a signal indicating the presence or absence of an occupant in the vehicle 2 is transmitted to the energy storage apparatus 1 at regular time intervals, and the management unit 55 may determine that a state in which a person stays in the vehicle 2 has changed to a state in which no person stays in the vehicle 2 when a value of the signal indicating that a person stays in the vehicle 2 has changed to a value indicating that no person stays in the vehicle 2.

(5) Although the smart entry system has been described as an example in the second embodiment, this is an example. The door lock may be performed using a physical key or a touch key. In that case, the predetermined condition may be that the door is locked by the physical key or the touch key after the vehicle 2 is parked, and that a certain period of time has elapsed since the door was locked.

(6) In the above embodiment, the lithium-ion battery is described as an example of the energy storage device 12, but the energy storage device 12 may be a capacitor that undergoes an electrochemical reaction.

(7) Although a four-wheel vehicle is described as an example of the vehicle 2 in the above embodiment, the vehicle 2 may be a motorcycle.

(8) In the above embodiment, the case where the vehicle 2 is an engine vehicle has been described as an example, but the vehicle 2 may be an electric vehicle. When the BMS 50 is mounted on an electric vehicle, the effect of diagnosing a failure of the relay 54 while suppressing the operation sound of the relay 54 from being heard by a person becomes more significant than when mounted on an engine vehicle.

(9) In the above embodiment, the case where whether or not the predetermined condition is satisfied is determined from the information received from the vehicle 2 has been described as an example, but whether or not the predetermined condition is satisfied can be also determined from the information acquired from the outside of the vehicle. Therefore, the communication unit may communicate with the outside of the vehicle.

For example, the communication unit may communicate with a surveillance camera installed in the parking lot. In that case, the predetermined condition may be that no person is detected within the vehicle and within a certain distance from the vehicle from the image received from the surveillance camera.

Alternatively, the communication unit may communicate with a portable information terminal such as a smartphone. In that case, the predetermined condition may be that the communication with the portable information terminal is interrupted by the person leaving the vehicle for a certain distance or more.

Alternatively, the communication unit may receive the position information from the portable information terminal. In that case, the predetermined condition may be that the position of the portable information terminal is a position separated from the vehicle for a certain distance or more.

(10) Although the communication unit 51D and the current sensor 51 are described as examples of the acquisition unit in the above embodiment, the acquisition unit may be a radar that detects a person inside or outside the vehicle. As the radar, for example, LIDAR (Laser Imaging Detection And Ranging) can be used. In that case, the predetermined condition may be that no person is detected within a certain distance from the vehicle 2 including the inside of the vehicle 2.

(11) In the second embodiment, the case has been described as an example in which whether or not the predetermined condition is satisfied is determined from the characteristic current waveform of the smart entry system. On the other hand, other than the smart entry system, if a characteristic current waveform appears when there is a possibility that no person stays within a certain distance from the vehicle 2 including the inside of the vehicle 2, whether or not the predetermined condition is satisfied may be determined according to the current waveform.

(12) In the above embodiment, the case where a process of determining whether or not the information acquired by the acquisition unit satisfies a predetermined condition, and a process of operating the relay 54 and diagnosing a failure of the relay 54 when the predetermined condition is satisfied are executed by the management unit 55 of the BMS 50 has been described as an example. On the other hand, at least one of these processes may be executed by an external device.

For example, the information acquired by the acquisition unit may be transmitted to a portable information terminal such as a smartphone or a computer connected to a communication network, and the portable information terminal or computer may determine whether or not a predetermined condition is satisfied. If the predetermined condition is satisfied, the portable information terminal or computer may operate the relay 54 via the management unit 55 to diagnose the failure of the relay 54.

(13) In the above embodiment, the case where the BMS 50 determines whether or not a predetermined condition is satisfied has been described as an example, but the determination may be made by AI (Artificial Intelligence).

DESCRIPTION OF REFERENCE SIGNS

2: vehicle
12: energy storage device
50: battery management system (an example of management device)
51: current sensor (an example of acquisition unit)
54: relay (an example of component)
55: management unit
55D: communication unit (an example of acquisition unit)

The invention claimed is:

1. A management device for an energy storage device mounted on a vehicle, the management device comprising:
a management unit;
a component that operates according to an instruction of the management unit and that generates an operation sound; and
an acquisition unit that acquires information, wherein
the management unit operates the component and diagnoses a failure of the component when the information acquired by the acquisition unit satisfies a predetermined condition indicating a possibility that no person stays within the vehicle and within a certain distance from the vehicle.

2. The management device according to claim 1, wherein
the component includes a relay connected in series with the energy storage device, and
the management unit, when an abnormality of the energy storage device is predicted, protects the energy storage device from the abnormality by opening the relay.

3. The management device according to claim 1, wherein
the acquisition unit includes a communication unit that communicates with the vehicle,
the management unit determines whether or not the vehicle has been parked and whether or not a state in which a person stays in the vehicle has changed to a state in which no person stays in the vehicle, based on a signal received by the communication unit, and
the predetermined condition includes that after the vehicle is parked, a state in which a person stays in the vehicle has changed to a state in which no person stays in the vehicle, and a predetermined time has passed from when a state in which a person stays in the vehicle has changed to a state in which no person stays in the vehicle.

4. The management device according to claim 1, wherein
the acquisition unit includes a communication unit that communicates with the vehicle, and a current sensor that measures a current value of a current flowing through the energy storage device,
the management unit determines whether or not the vehicle is parked based on a signal received by the communication unit, and
the predetermined condition includes that a current value of the current flowing through the energy storage device temporarily increases in a process in which after the vehicle is parked, the current value gradually decreases.

5. The management device according to claim 1, wherein
the acquisition unit includes a communication unit that communicates with the outside of the vehicle.

6. The management device according to claim 1, wherein the vehicle comprises a four-wheel vehicle.

7. The management device according to claim 1, wherein the vehicle comprises an electric vehicle.

8. An energy storage apparatus, comprising:
a management device according to claim 1;
an energy storage device; and
an outer case that houses the management device and the energy storage device.

9. The energy storage apparatus according to claim 8, wherein
an external terminal is fixed to the outer case, and
the energy storage device is connected to the external terminal via a conductive member and the component that generates the operation sound.

10. The energy storage apparatus according to claim 8, wherein
the acquisition unit includes a communication unit that communicates with a portable information terminal carried by a person.

11. The energy storage apparatus according to claim 10, wherein
the management unit determines whether or not a predetermined condition indicating a possibility that no person stays within the vehicle and within a certain distance from the vehicle is satisfied based on a communication between the portable information terminal and the communication unit.

12. The energy storage apparatus according to claim 8, wherein
the management unit operates the component and diagnoses a failure of the component, based on a determination by a portable information terminal or a computer outside the vehicle, whether or not a predetermined condition indicating a possibility that no person stays within the vehicle and within a certain distance from the vehicle is satisfied.

13. A failure diagnosis method of an energy storage apparatus mounted on a vehicle,
the energy storage apparatus including a component that generates an operation sound,
the failure diagnosis method comprising:
acquiring information; and
operating the component and diagnosing a failure of the component when the acquired information satisfies a predetermined condition indicating a possibility that no person stays within the vehicle and within a certain distance from the vehicle.

14. The failure diagnosis method according to claim 13, which acquires the information by communicating with a portable information terminal carried by a person.

15. The failure diagnosis method according to claim 13, further comprising
operating the component and diagnosing a failure of the component, based on a determination by a portable information terminal or a computer outside the vehicle, whether or not a predetermined condition indicating a possibility that no person stays within the vehicle and within a certain distance from the vehicle is satisfied.

* * * * *